(12) United States Patent
Basler-Reeder et al.

(10) Patent No.: US 10,895,654 B2
(45) Date of Patent: Jan. 19, 2021

(54) METHOD FOR GENERATING OPTIMIZED SEISMIC TARGET SPECTRUM

(71) Applicants: Kyle J. Basler-Reeder, The Woodlands, TX (US); Spyridon K. Lazaratos, Houston, TX (US); Eugene C. Trantham, Houston, TX (US); Michael P. Matheney, The Woodlands, TX (US)

(72) Inventors: Kyle J. Basler-Reeder, The Woodlands, TX (US); Spyridon K. Lazaratos, Houston, TX (US); Eugene C. Trantham, Houston, TX (US); Michael P. Matheney, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 384 days.

(21) Appl. No.: 15/941,474

(22) Filed: Mar. 30, 2018

(65) Prior Publication Data
US 2018/0306940 A1 Oct. 25, 2018

Related U.S. Application Data

(60) Provisional application No. 62/487,517, filed on Apr. 20, 2017.

(51) Int. Cl.
*G01V 1/36* (2006.01)
*G01V 1/30* (2006.01)

(52) U.S. Cl.
CPC ............. *G01V 1/364* (2013.01); *G01V 1/306* (2013.01); *G01V 1/307* (2013.01)

(58) Field of Classification Search
None
See application file for complete search history.

(56) References Cited

U.S. PATENT DOCUMENTS

| | | | | | |
|---|---|---|---|---|---|
| 4,779,236 | A | * | 10/1988 | Sondergeld | G01V 1/44 181/104 |
| 5,798,982 | A | * | 8/1998 | He | G01V 1/306 367/28 |
| 6,021,379 | A | * | 2/2000 | Duren | G01V 1/282 367/73 |
| 6,058,073 | A | * | 5/2000 | VerWest | G01V 1/28 367/31 |
| 6,324,477 | B1 | * | 11/2001 | Bork | G01V 1/30 702/17 |

(Continued)

OTHER PUBLICATIONS

Partyka, G.A., Gridley, J.M., and Lopez, J. 1999, Interpretational Applications of Spectral Decomposition in Reservoir Characterization, The Leading Edge, vol. 18, No. 3, pp. 353-360.

(Continued)

*Primary Examiner* — Tung S Lau
(74) *Attorney, Agent, or Firm* — ExxonMobil Upstream Research Company—Law Department

(57) ABSTRACT

A method, including: determining, with a computer, a reflectivity spectrum; generating, with a computer, a target spectrum that is a convolution of a roll-off function and the reflectivity spectrum; and filtering, with a computer, seismic data to cause the seismic data to have the target spectrum.

8 Claims, 10 Drawing Sheets

(56) References Cited

U.S. PATENT DOCUMENTS

| | | | | |
|---|---|---|---|---|
| 7,414,919 B2* | 8/2008 | Li | ............ | G01V 1/003 |
| | | | | 367/25 |
| 2007/0064531 A1* | 3/2007 | DuBose, Jr. | ............ | G01V 1/364 |
| | | | | 367/43 |
| 2008/0232193 A1* | 9/2008 | An | ............ | G01V 1/364 |
| | | | | 367/38 |
| 2011/0251797 A1* | 10/2011 | Leger | ............ | G01V 11/00 |
| | | | | 702/14 |
| 2014/0078864 A1* | 3/2014 | Freitas | ............ | G01V 1/42 |
| | | | | 367/57 |
| 2014/0149042 A1* | 5/2014 | Zhang | ............ | G01V 1/301 |
| | | | | 702/11 |
| 2016/0131781 A1* | 5/2016 | Sun | ............ | G01V 1/282 |
| | | | | 367/7 |
| 2017/0052268 A1* | 2/2017 | Mcardle | ............ | G01V 1/302 |
| 2018/0217281 A1* | 8/2018 | Basler-Reeder | ............ | G01V 1/302 |

OTHER PUBLICATIONS

Wang, Y., (2007). "Seismic time-frequency spectral decomposition by matching pursuit", Geophysics, 72(1), pp. V13-V20.

* cited by examiner

METHOD FOR GENERATING OPTIMIZED SEISMIC TARGET SPECTRUM

CROSS-REFERENCE TO RELATED APPLICATION

This application claims the benefit of U.S. Provisional Patent Application 62/487,517 filed Apr. 20, 2017 entitled METHOD FOR GENERATING OPTIMIZED SEISMIC TARGET SPECTRUM, the entirety of which is incorporated by reference herein.

TECHNOLOGICAL FIELD

Exemplary embodiments described herein pertain generally to the field of seismic imaging spectral enhancement, which can include a process of improving seismic resolution or interpretability.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Seismic data in the time domain consists of reflectors whose relative position in time indicates the structure, and whose amplitude is dependent on elastic property contrasts. Recently, a processing technique called de-ghosting (e.g., mitigation of adverse effects of sea-surface ghosts on marine seismic measurements) has become very popular, which produces a very low peak frequency; amplitude Q compensation is often applied to ameliorate this issue slightly, but the resulting spectra are still dominated by low frequencies. The effect of this processing is that seismic data becomes difficult to interpret, with reflector geometries obscured due to the low frequency bias. Amplitude Q compensation done poorly results in a steep spectral amplitude gradient on the high frequency end, which produces wavelets with very strong side-lobe energy, making seismic data even more difficult to interpret.

One common approach that can help "see through" the frequency spectrum and/or improve discernment of thin geometries is spectral decomposition, in which band-pass filters are used to separate seismic data into multiple constituent frequency bands (Partyka et. al, 1999; Wang, 2007). Spectral decomposition produces multiple seismic volumes of varying peak frequency; which are interpreted in concert, usually using a technique called RGB color blending. This method is able to see low- and high-frequency energy simultaneously, allowing interpreters to effectively see through low frequency biases. A drawback of using narrow band-pass filters is that they tend to create strong side-lobe energy, similarly to when amplitude Q is applied incorrectly, as each spectrally decomposed volume has lower bandwidth than the sum of its parts; the side-lobe energy makes it challenging to determine which events are the true reflector geometries.

Another approach to improving resolution is generalized as "spectral whitening", which is a process involving arbitrarily boosting the high frequencies or filtering out the low frequencies. In theory, this approach boosts resolution, as per the Rayleigh criterion; however, this method also significantly boosts sidelobe energy, and also tends to boost noise. The result of this method is increased resolution at the cost of decrease ability to recognize real reflector energy.

One other crude approach is one application of a derivative operator followed by a −90° phase rotation, or two derivative operators followed by multiplication by −1; this approach can also improve resolution, but at the cost of amplitude fidelity, boosting sidelobe energy, and severely boosting high frequency noise. Derivative operators can be useful due to their simplicity, but the severity of the drawbacks makes them the least desirable of the resolution-boosting techniques.

SUMMARY

A method, including: obtaining, with a computer, a reflectivity spectrum; generating, with a computer, a target spectrum that is a convolution of a roll-off function and the reflectivity spectrum; and filtering, with a computer, seismic data to cause the seismic data to have the target spectrum.

In the method, the reflectivity spectrum can be derived from well data.

In the method, the roll-off function can be a Gaussian function.

In the method, the obtaining can include determining a plurality of reflectivity spectra, each corresponding to a well, and the method can further include: determining the plurality of reflectivity spectrums by combining velocity and density well logs.

In the method, the combining the velocity and the density well logs can include: generating impedance logs from the velocity and density well logs.

In the method, the determining the plurality of reflectivity spectrums can include: fitting a line to the plurality of reflectivity spectrums on a cross-plot of a log of amplitude and a log of frequency.

In the method, the generating the target spectrum can include generating a plurality of target spectrums by convolving the reflectivity spectrum with a plurality of roll-off functions, each being a Gaussian with a different half power width, and the filtering includes applying a plurality of filters to the seismic data to cause the seismic data to have each of the plurality of target spectrums, and the method can further include: analyzing wavelets resulting from the filtering and determining which of the plurality of filters yields filtered seismic data with a best signal to noise ratio.

The method can further include analyzing the seismic data, after the filtering, using a well tie.

In the method, the filtering can include deghosting the seismic data.

In the method, the filtering can apply reflectivity shaping to angle stacks to achieve bandwidth-balance.

In the method, the filtering can apply reflectivity shaping pre-migration or pre-stack.

In the method, the filtering can apply reflectivity shaping pre-migration and pre-stack.

The method can include interpreting the seismic data after the filtering, wherein the interpreting can include identifying events that are indicative of a presence of hydrocarbons.

The method can include causing a well to be drilled at a location determined from the interpreting.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement can shape seismic data to an optimal spectrum, by convolving the spectrum measured from well logs with a Gaussian spectrum centered at zero that is optimized for maximum compactness with minimum sidelobe energy. The present technological advancement is extremely fast, as it is just a filter applied post-stack in the frequency domain and produces seismic data that are optimized for interpretation, with very low side-lobe energy and optimal wavelet compactness for any given signal:noise distribution. This present technological advancement is concerned with improving delineation of reflector geometries (often referred to as "top and base"), which can be difficult when seismic data are low frequency or have strong sidelobe energy (also known as a "ringy dataset").

The method can also be applied to multiple stacks (such as a near and far stack) to achieve spectral balancing, producing broader bandwidth than simple bandwidth-balancing procedures (such as spectrally shaping all the angle stacks to the region of overlapping spectral energy density).

Figure 1:
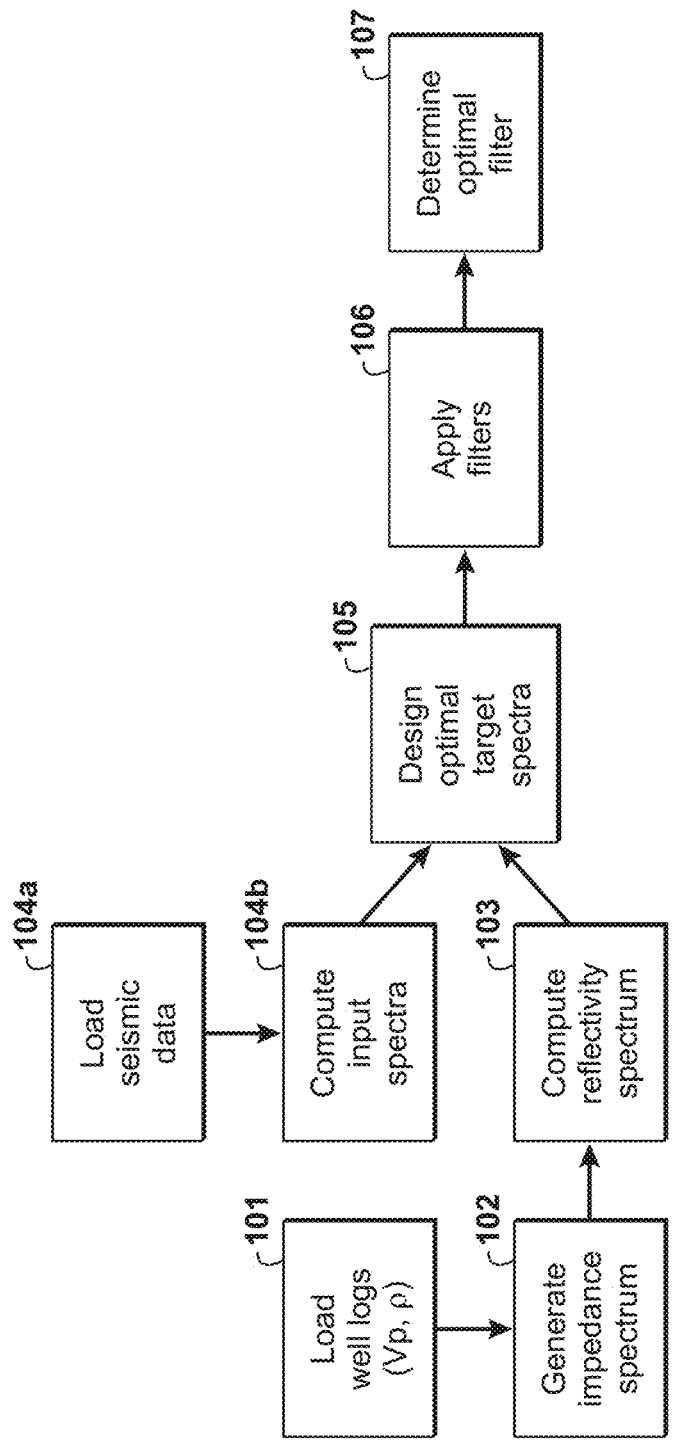
FIG. 1 illustrates an exemplary method embodying the present technological advancement.

FIG. 1 illustrates an exemplary method embodying the present technological advancement. Generally, a first part of the method involves measuring or determining a slope of the impedance spectrum and estimating the input seismic spectra, and a second part of the method generates a suite of optimized seismic filters that are designed based on the computed reflectivity spectrum and a single parameter: the Gaussian half-power width. Finally, the filters are applied, and the results are analyzed to determine which Gaussian half-power width parameter is optimal for the dataset.

Step 101 includes obtaining Vp and density logs. The velocity log (shown in FIG. 2A) is a display of traveltime of acoustic waves versus velocity in a well. Sometimes these are referred to as a sonic log. The density log (shown in FIG. 2B) is a display of traveltime of versus density. These measurements are conventionally obtained using down hole tools known to those of ordinary skill in the art.

Figure 2:
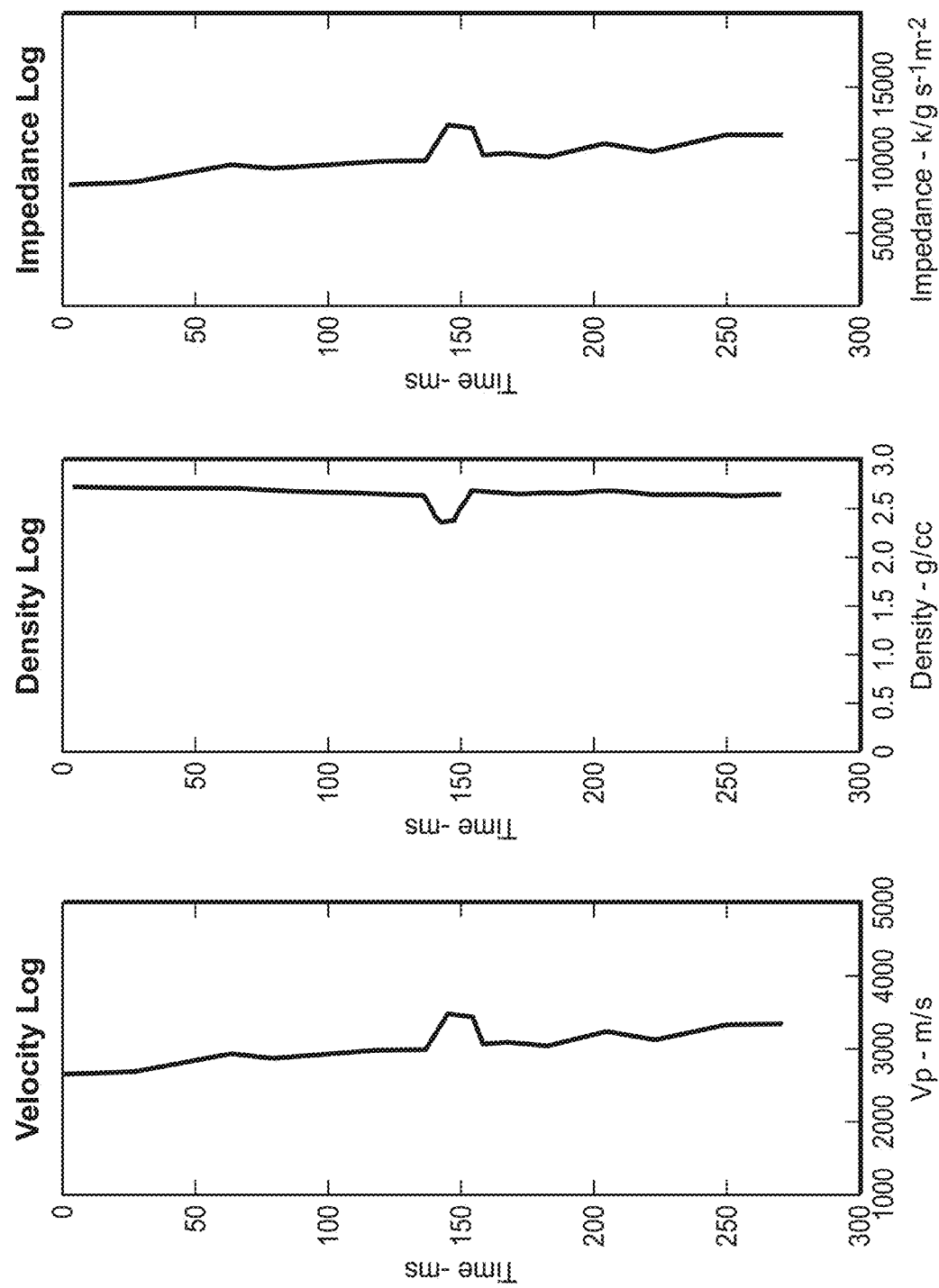
FIG. 2A illustrates an exemplary velocity log.
FIG. 2B illustrates an exemplary density log.
FIG. 2C illustrates an exemplary impedance log.

FIG. 2C shows an impedance log, which can be obtained by taking the product of the velocity and density logs.

Figure 3:
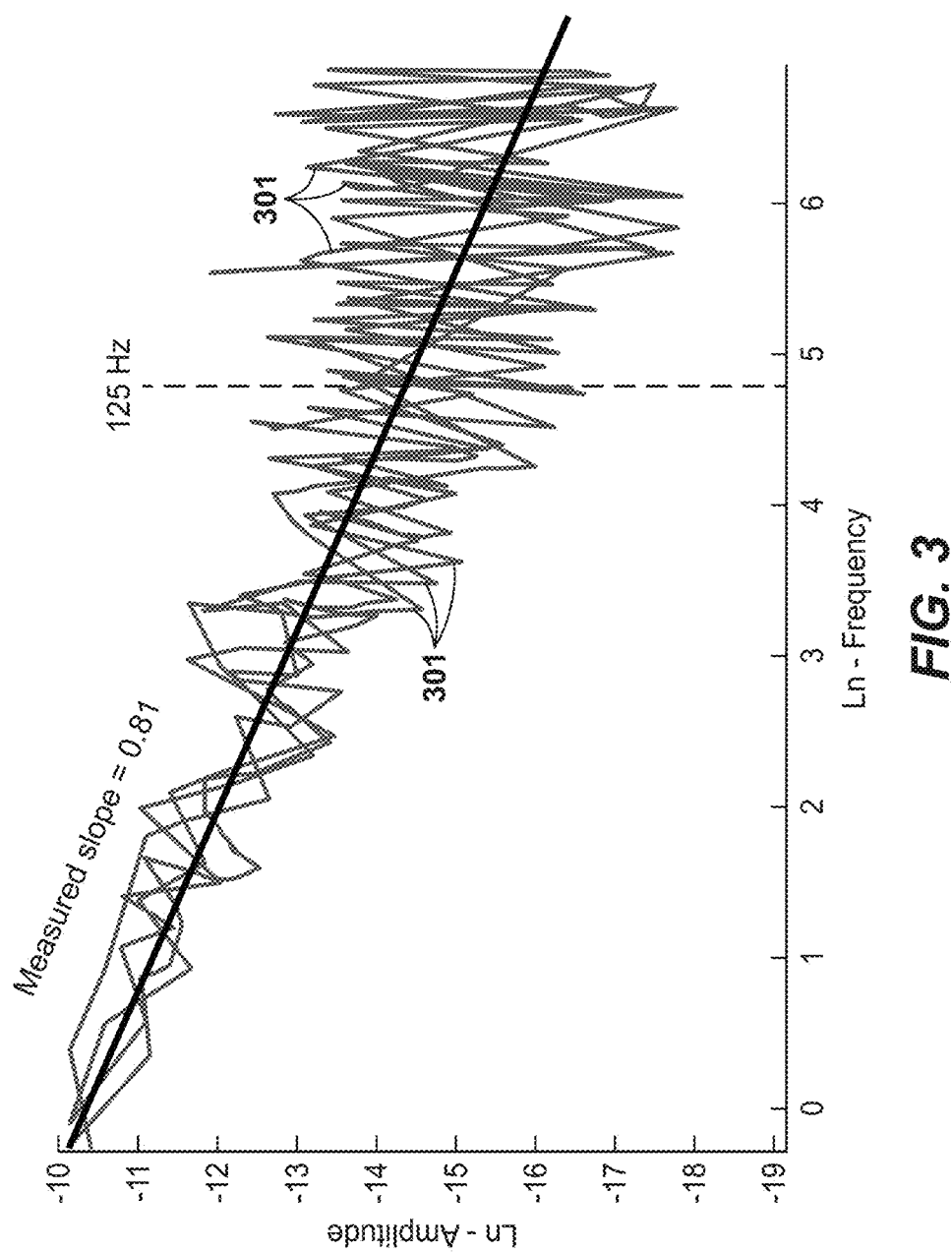
FIG. 3 illustrates a natural log of amplitude vs. natural log of frequency plot of an impedance spectrum for a plurality of different wells.

In step 102, the impedance log is transformed into the frequency domain with a suitable transform (e.g., a Fourier transform) to create an impedance spectrum, and then a cross-plot of the natural log (ln) of frequency versus the natural log of the impedance spectrum is generated. While this example uses natural log, the log of other bases could be used. FIG. 3 illustrates such an ln amplitude vs. ln frequency plot of an impedance spectrum for a plurality of different wells (wherein each of the lines constituting 301 correspond to a different well). Then, a line 302 is fit to the 301 lines, with line 302 being impedance spectrum that is subsequently used. The line 302 can be fit with any known line-fitting algorithm, or could even be fit by a user. FIG. 3 shows that much of the data is above 125 Hz, and the line could be fit using only the portion of the data that is below 125 Hz. Frequencies greater than 125 Hz may not correspond to events in the data (i.e., just noise).

In step 103, the reflectivity spectrum can determined by taking the first derivative of the impedance logs with respect to time, computing the fractional differences (reflectivity=fractional difference of impedance), or reflectivity can be defined in the frequency domain (reflectivity=multiplication by frequency in the Fourier domain representation of impedance).

If a well is not available, then the reflectivity spectrum can be approximated with a line of slope 0.15, or a line with slope selected from 0.1 to 0.25. FIG. 5 shows an example of a reflectivity spectrum derived from an impedance spectrum with a slope of 0.15.

In step 104a, seismic data is obtained. An important goal of seismic prospecting is to accurately image subsurface structures commonly referred to as reflectors. Seismic prospecting is facilitated by obtaining raw seismic data during performance of a seismic survey. During a seismic survey, seismic energy can be generated at ground or sea level by, for example, a controlled explosion (or other form of source, such as vibrators), and delivered to the earth. Seismic waves are reflected from underground structures and are received by a number of sensors/receivers, such as geophones. The seismic data received by the geophones is processed in an effort to create an accurate mapping of the underground environment.

Figure 4:
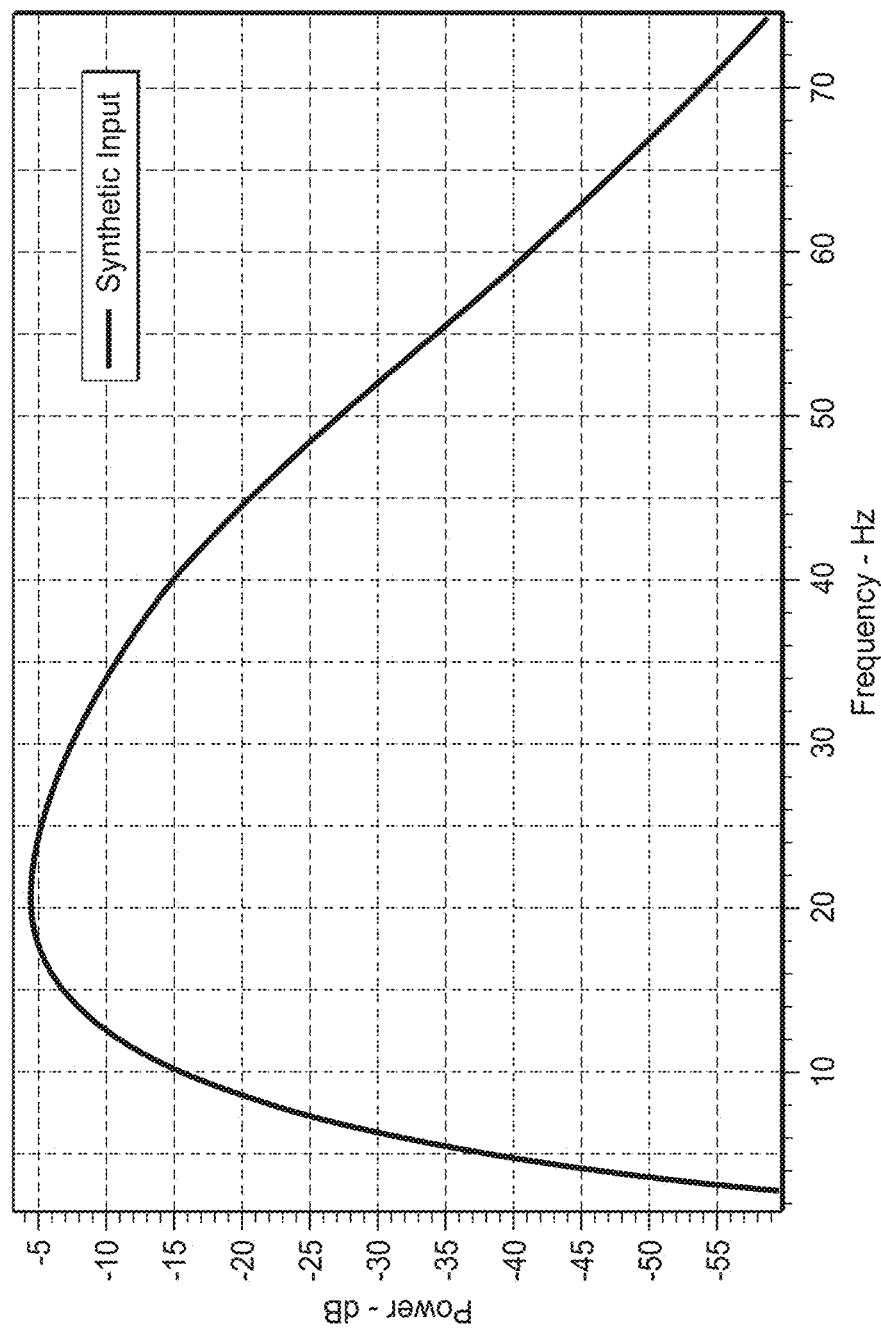
FIG. 4 illustrates an exemplary spectra of input seismic data.

In step 104b, a spectra of the input seismic data is estimated. This can be achieved by taking the Fourier transform to each individual trace in a predefined X-Y-Time region of a seismic cube and then taking the average of the seismic amplitude spectra. Multiple regions can be taken when lateral or depth variation in the seismic spectra is present. Another method is to use autocorrelation functions in the time domain instead of the Fourier transform. FIG. 4 provides an example of an input spectra estimation for seismic data.

Figure 5B:
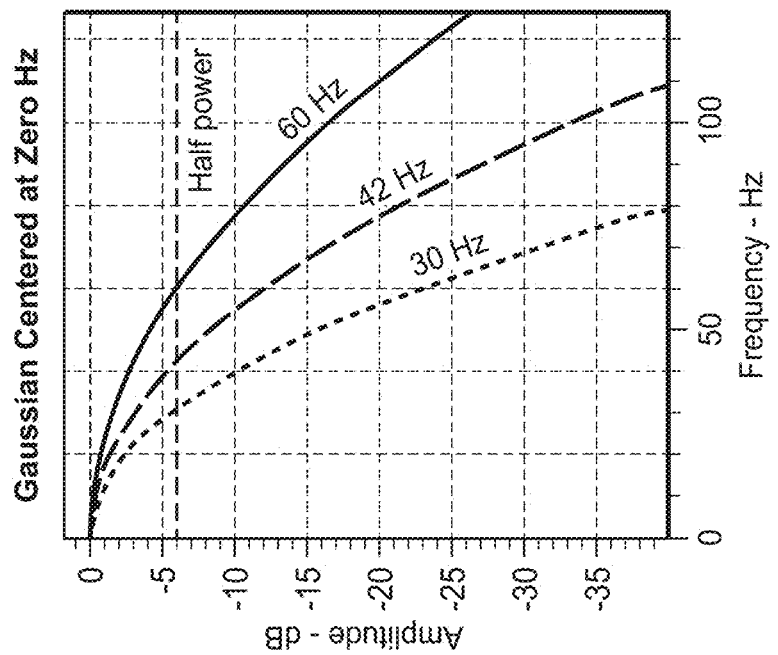
FIG. 5B illustrates an exemplary Gaussian centered at zero Hz.
Figure 5A:
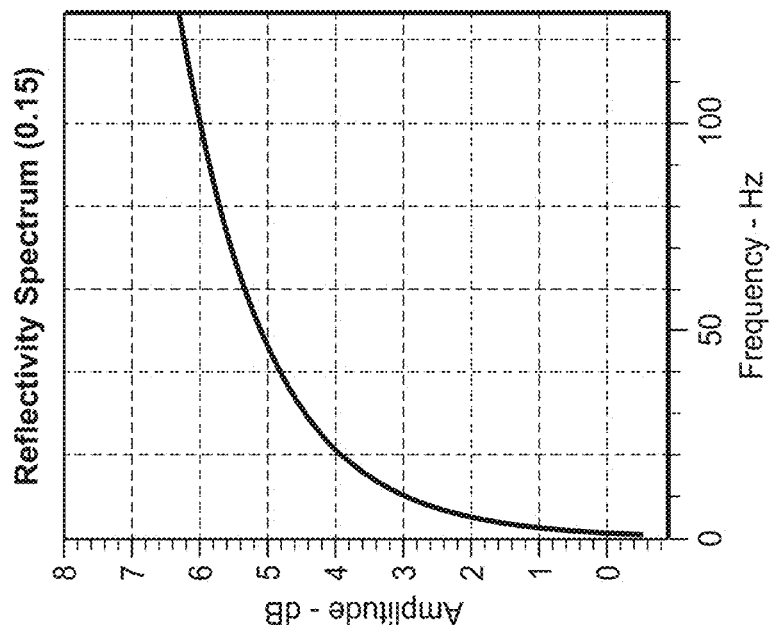
FIG. 5A illustrates an exemplary reflectivity spectrum with a slope of 0.15.
Figure 6:
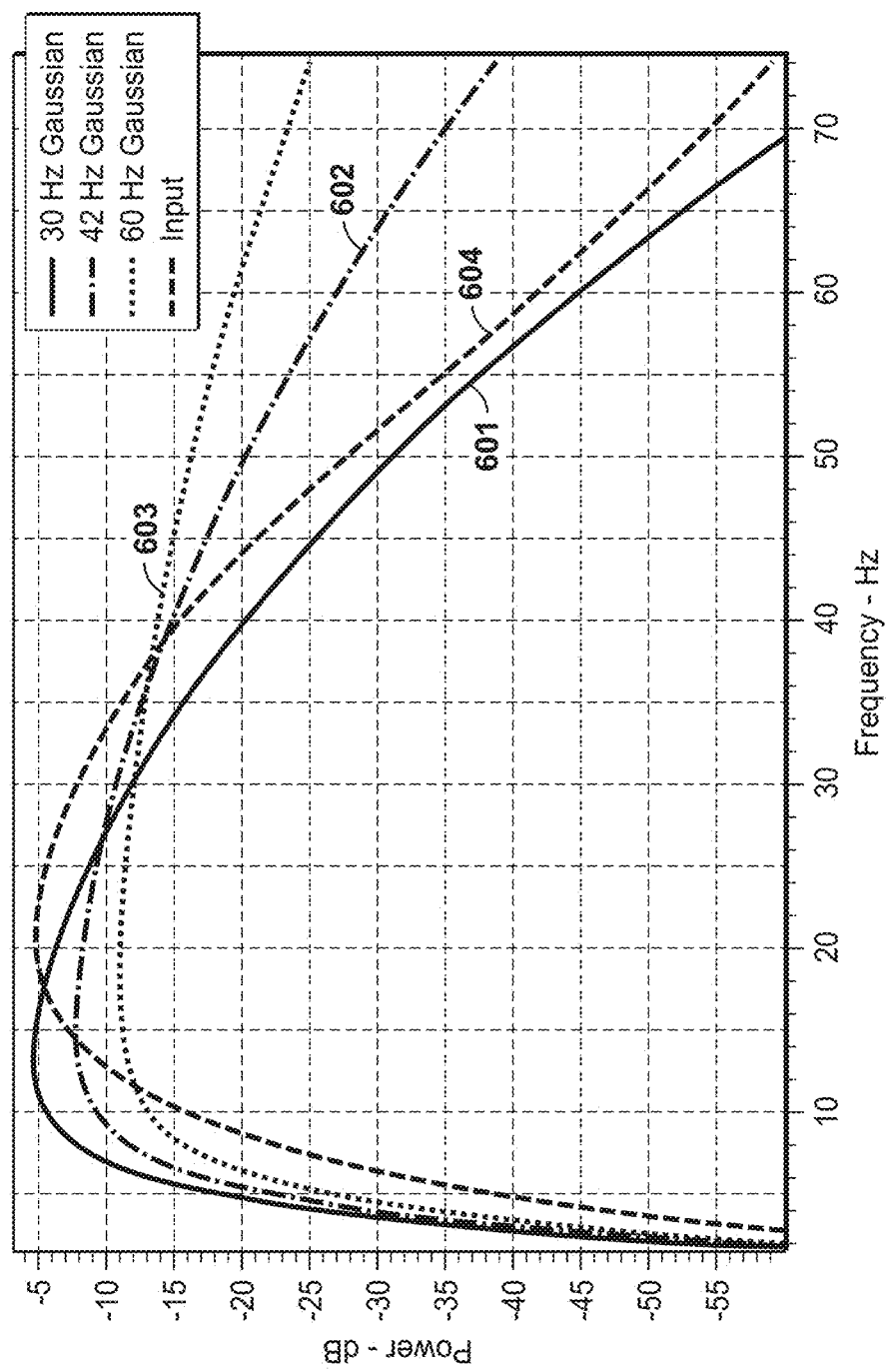
FIG. 6 illustrates a convolution of the reflectivity spectrum and various Gaussians.

Step 105 includes designing an optimal target spectrum, which can be a convolution of the reflectivity spectrum and a low-cut filtered Gaussian centered at zero Hz. A Gaussian is a filter whose impulse response is a Gaussian function (or at least an approximation to it). FIG. 5A illustrates an example of the reflectivity spectrum (derived from a line of slope 0.15) and FIG. 5B illustrates a plurality of Gaussians with different half-power widths (30 Hz, 42 Hz, and 60 Hz). The half-power width is chosen based on high frequency signal/noise; the process of spectrally shaping seismic data is done empirically and should be familiar to anyone skilled in the art. Choosing the optimal filter can also be guided by using well ties, which are also familiar to anyone skilled in the art. FIG. 6 illustrates each of these three Gaussians having been convolved with the reflectivity spectrum of FIG. 5A, along with the input spectra from FIG. 4. The 42 Hz and 60 Hz spectra (602/603) actually boost the higher frequencies, whereas the 30 Hz spectrum (601) does not. While all three Gaussians also boost the low frequencies (at least those below 11 Hz), relative to input spectrum 604, the boost to the high frequencies is much greater so as to address the problem of low frequency bias.

Step 106 includes applying appropriate filters to the input seismic data to achieve the desired optimal target spectra. Step 106 can include transforming the input seismic data into the frequency domain, applying frequency filters, and converting the resulting filtered data back to the time domain. For example, the results of using the 30, 42, and 60 Hz Gaussians can each be obtained.

Figure 7:
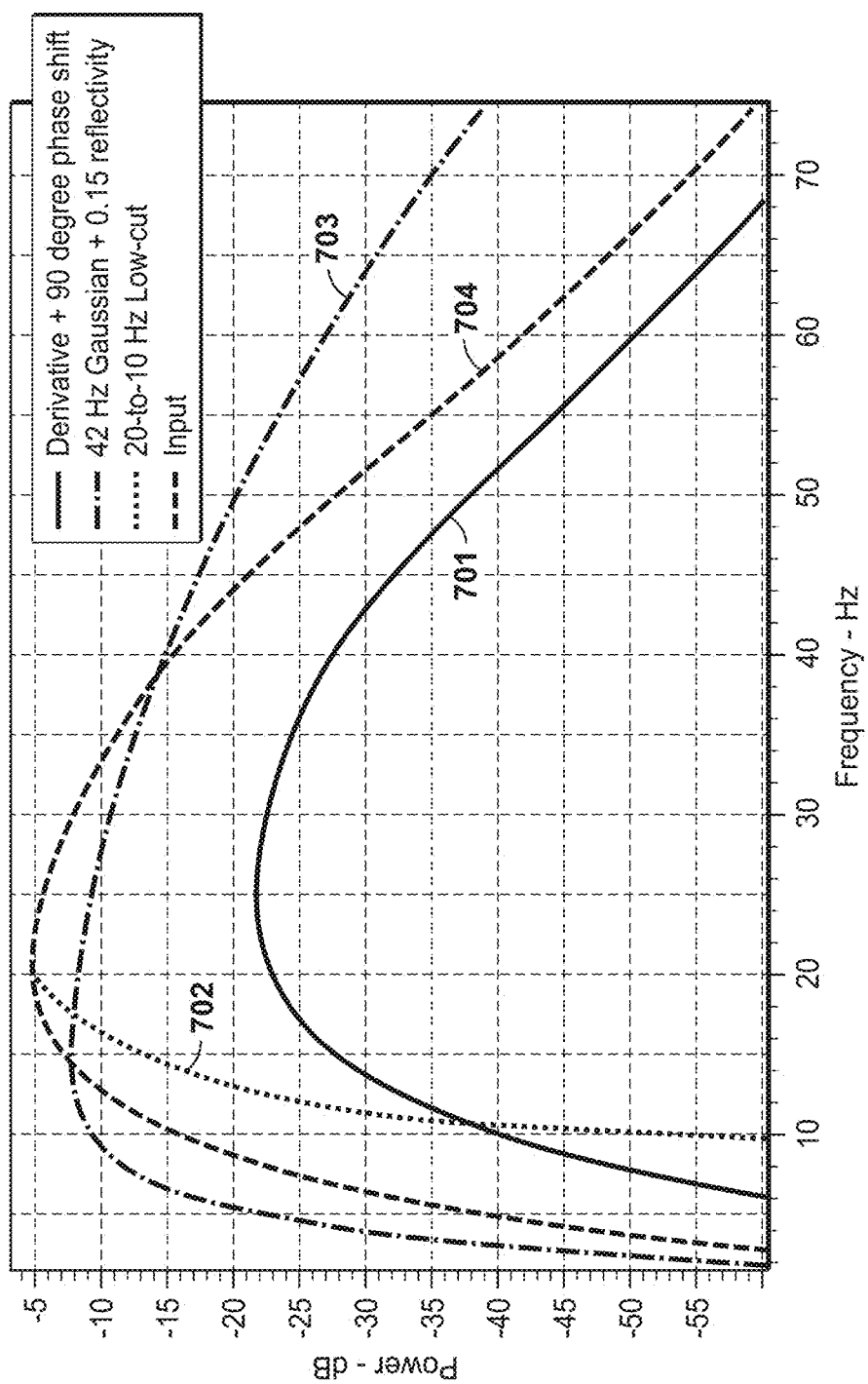
FIG. 7 is a comparison of exemplary results obtained from the present technological advancement to conventional techniques.

FIG. 7 is a comparison of exemplary results obtained from the present technological advancement to conventional techniques. Displayed are the resulting spectra of three different techniques; application of a derivative operator and −90 degree phase rotation (701), 20-to-10 Hz low-cut filter (702), and 42 Hz Gaussian half-power width reflectivity shaping (703) (from FIG. 6). These are also compared with the input spectra 704 (from FIG. 4). The low-cut filter (702) and derivative technique (701) remove relative and absolute amplitude information from the input spectrum, which can lead to distorted amplitude interpretation.

Step 107 includes analyzing the resulting wavelets. A wavelet can be a one-dimensional pulse that is usually a basic response from a single reflector. The wavelet originates as a packet of energy from the source point, having a specific origin in time, and is returned to the receivers as a series of events distributed in time and energy. Wavelets decay due to the loss of energy as heat during propagation. This is more extensive at high frequency, so wavelets tend to contain less high-frequency energy relative to low frequencies at longer traveltimes. For the results obtained from using the 30, 42, and 60 Hz Gaussians, these results can be compared to each other based on signal/noise or signal/sidelobe amplitude.

Figure 8:
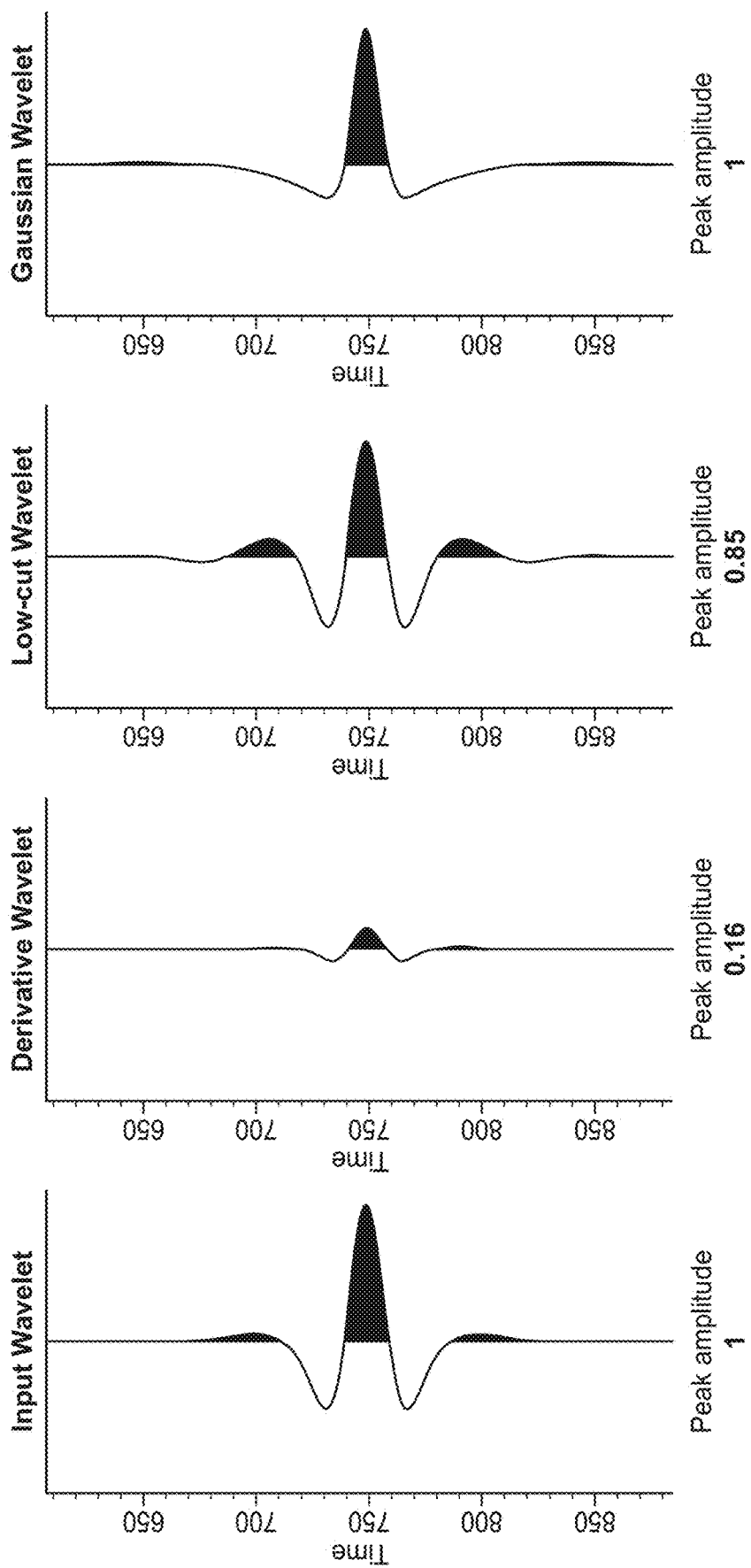
FIG. 8 is a comparison of exemplary results obtained from the present technological advancement to conventional techniques.
Figure 9:
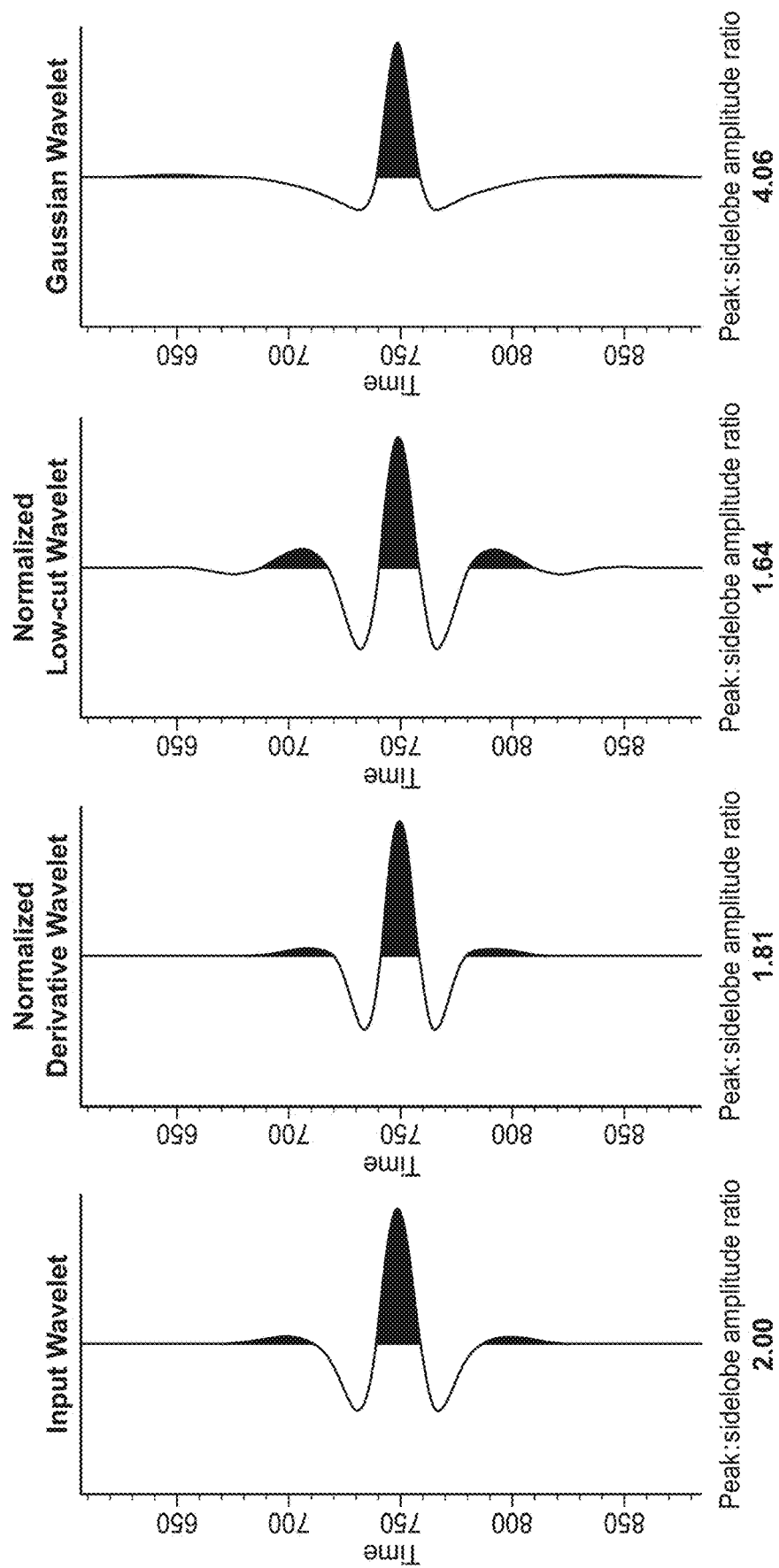
FIG. 9 is a comparison of exemplary results obtained from the present technological advancement to conventional techniques.

FIG. 8 is a comparison of exemplary wavelet obtained from the present technological advancement to conventional techniques. The Gaussian wavelet (resulting from the present technological advancement) is superior to those obtained through conventional techniques because the peak amplitude is preserved (the derivative wavelet and the low-cut wavelet have significantly reduced peak amplitudes relative to the input wavelet). FIG. 9 shows the wavelets in FIG. 8 after normalization to the input wavelet. For the present technological advancement, the peak/side lobe amplitude ratio is more than twice as large as the input wavelet; whereas the conventional techniques have a reduction in peak/side lobe amplitude ratio (relative to the input wavelet). By utilizing a measured reflectivity spectrum for the low end frequencies and a Gaussian centered at zero for the high end frequencies, the present technological advancement is able to generate an optimal target spectrum that minimizes sidelobe energy while maximizing wavelet compactness.

Step 107 can additionally include further analysis to determine an optimal filter. For example, analyzing the outputs from using the 30, 42, and 60 Hz Gaussians can be done using well ties to determine the optimal filter. The well logs can be used as a check to determine if events appearing in the filtered seismic data correspond to actual events appearing in the well logs. As the half power width of the Gaussian increases, the higher frequencies can start generating phantom events, which are not correlated by the well logs. Thus, the well logs can be used to determine an appropriate half-power width for the Gaussian. Furthermore, outputs from step 106 can always be analyzed through visual inspection of the signal/noise ratio.

The filtered seismic data can then examined with a goal of identifying geological formations that may contain hydrocarbons (e.g., oil and/or natural gas). Returning to FIG. 9, the present technological advancement preserves amplitude of the wavelet, and rather than having strong secondary or tertiary sidelobes (see the derivative and low-cut wavelets), the Gaussian wavelet of the present technological advancement has sidelobes that are shallow and more distributed, relative to conventional techniques. In effect, the side lobes of conventional wavelets obscure geological formations when the seismic data is being interpreted or falsely leads an interpreter to conclude a geological formation is present when one is not.

Higher accuracy in interpreting seismic data is highly useful in hydrocarbon management to assess and evaluate hydrocarbon assets. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. Thus, the geologic events which could not previously be resolved in the seismic data through conventional processing, and that can be resolved using the present technological advancement, can identify subsurface locations at which to explore for hydrocarbons (i.e., cause a well to be drilled a particular location based on an indication of hydrocarbon potential identified in the seismic data processed according to the present technological advancement).

Furthermore, the present technological advancement can function as a one dimensional (1D) de-ghosting operator. The present technological advancement can provide a filter that is effective in removing a ghost notch in marine seismic data. In marine seismic data, reflection that result from the water surface are referred to as ghost reflections. Combined with the reflections directly from the energy source to the bottom reflectors and then to the receivers, the reflectors cause notches in the frequency spectrum. These notches are ghost notches and typically cause resolution loss in seismic imaging.

The present technological advancement can be used to perform reflectivity shaping pre-migration and/or pre-stack.

The present technological advancement can be used to merge reflectivity shaping into the amplitude Q (quality factor) application stage of a full wave-field inversion process, but using the reflectivity shaping target spectrum as the shape of the amplitude Q target filters.

The present technological advancement can be used for reflectivity shaping to angle stacks to achieve bandwidth-balance, which is spectrally modifying near-offset seismic stacks to far-offset seismic stacks, removing differential tuning brought about by differences in wavelet frequency content. In this application, the Gaussian (after convolution with the reflectivity spectrum) is set as the target and the far and near stacks are shaped to this Gaussian.

The examples discussed herein have been based on a Gaussian centered at zero Hz. However, the present technological advancement is not limited to Gaussians. For example, cosine roll-off could be used instead. Rather, any function with roll-off can be used.

Figure 10:
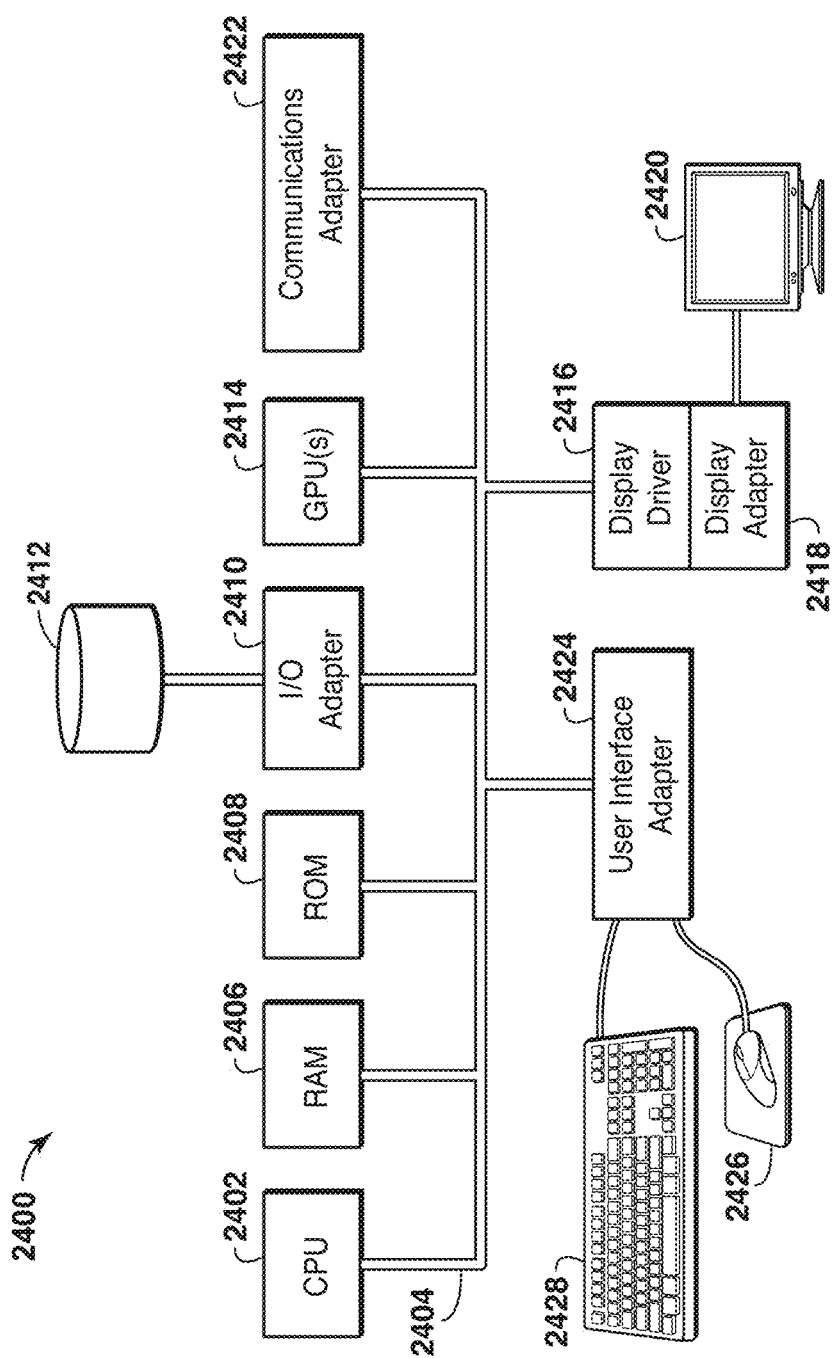
FIG. 10 illustrates a computer system that can execute the present technological advancement.

FIG. 10 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 10, additional CPUs may be present. Moreover, the computer system 2400 may comprise a networked, multi-processor computer system that may include a hybrid parallel CPU/GPU system. The CPU 402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following documents are hereby incorporated by reference in their entirety:

Partyka, G. A., Gridley, J. M., and Lopez, J. 1999, Interpretational Applications of Spectral Decomposition in Reservoir Characterization, The Leading Edge, vol. 18, No. 3, pg 353-360; and Yanghua Wang (2007). "Seismic time-frequency spectral decomposition by matching pursuit." GEOPHYSICS, 72(1), V13-V20.

What is claimed is:

1. A method, comprising:
   determining a reflectivity spectrum, wherein determining the reflectivity spectrum comprises:
      obtaining velocity and density well logs;
      generating impedance logs from the velocity and density logs;
      transforming the impedance logs into the frequency domain to create an impedance spectrum;
      generating a cross-plot of a log of frequency and a log of amplitude of the impedance spectrum; and
      fitting a line to the cross-plot and determining the reflectivity spectrum from the line;
   generating a target spectrum that is a convolution of a roll-off function and the reflectivity spectrum, wherein the roll-off function is a Gaussian function with a half-power width;
   filtering seismic data to cause the seismic data to have the target spectrum; and
   using the filtered seismic data to identify geological formations that are indicative of a presence of hydrocarbons.

2. The method of claim 1 wherein the generating the target spectrum includes generating a plurality of target spectrums by convolving the reflectivity spectrum with a plurality of roll-off functions, each being a Gaussian with a different half power width, and the filtering includes applying a plurality of filters to the seismic data to cause the seismic data to have each of the plurality of target spectrums.

3. The method of claim 1, further comprising analyzing the seismic data, after the filtering, using a well tie.

4. The method of claim 1, wherein the filtering includes deghosting the seismic data.

5. The method of claim 1, wherein the filtering applies reflectivity shaping to angle stacks to achieve bandwidth-balance.

6. The method of claim 1, wherein the filtering applies reflectivity shaping pre-migration or pre-stack.

7. The method of claim 1, wherein the filtering applies reflectivity shaping pre-migration and pre-stack.

8. The method of claim 1, further comprising causing a well to be drilled at a location determined from the interpreting.

* * * * *